(12) United States Patent
Bertsch et al.

(10) Patent No.: US 9,797,364 B2
(45) Date of Patent: Oct. 24, 2017

(54) METHOD FOR OPERATING AN INTERNAL COMBUSTION ENGINE AND INTERNAL COMBUSTION ENGINE

(71) Applicant: Daimler AG, Stuttgart (DE)

(72) Inventors: Dietmar Bertsch, Aspach (DE); Harald Ott, Sachsenheim (DE); Uwe Schaupp, Wernau (DE)

(73) Assignee: Daimler AG, Stuttgart (DE)

( * ) Notice: Subject to any disclaimer, the term of this patent is extended or adjusted under 35 U.S.C. 154(b) by 121 days.

(21) Appl. No.: 14/777,099

(22) PCT Filed: Feb. 15, 2014

(86) PCT No.: PCT/EP2014/000426
§ 371 (c)(1),
(2) Date: Sep. 15, 2015

(87) PCT Pub. No.: WO2014/146744
PCT Pub. Date: Sep. 25, 2014

(65) Prior Publication Data
US 2016/0003209 A1    Jan. 7, 2016

(30) Foreign Application Priority Data
Mar. 19, 2013    (DE) .................. 10 2013 004 728

(51) Int. Cl.
*F02P 5/04* (2006.01)
*F02D 41/30* (2006.01)
(Continued)

(52) U.S. Cl.
CPC ............ *F02P 5/045* (2013.01); *F02D 35/021* (2013.01); *F02D 37/02* (2013.01);
(Continued)

(58) Field of Classification Search
CPC .... F02P 5/00; F02P 5/045; F02P 15/08; F02P 17/02; F02P 17/12; Y02T 10/44;
(Continued)

(56) References Cited

FOREIGN PATENT DOCUMENTS

| DE | 100 34 725 A1 | 2/2001 |
|----|----|----|
| DE | 10 2007 034 390 A1 | 1/2009 |

(Continued)

OTHER PUBLICATIONS

Japanese Notification of Reasons for Refusal issued in Japanese counterpart application No. 2016-503562 dated Jun. 7, 2016, with partial English translation (Five (5) pages).

(Continued)

*Primary Examiner* — Hai Huynh
(74) *Attorney, Agent, or Firm* — Crowell & Moring LLP

(57) ABSTRACT

A method for operating a combustion engine is disclosed. In an embodiment, the method includes: generating several sparks to ignite a fuel-air mixture in a combustion chamber by an ignition device of the combustion engine, determining a combustion duration of at least one of the sparks, detecting a deviation of an actual operation from a target operation of the combustion engine at least depending on the combustion duration, compensating for the deviation by implementing at least one measure which influences a combustion of the fuel-air mixture in the combustion chamber, determining the combustion duration of the chronological first of the sparks, allocating the first spark to a first spark type or to a second spark type depending on the combustion duration, and implementing the at least one measure if at least one value which characterizes a frequency of one of the spark types exceeds a threshold value.

12 Claims, 2 Drawing Sheets

(51) Int. Cl.
*F02P 5/00* (2006.01)
*F02P 15/08* (2006.01)
*F02D 41/40* (2006.01)
*F02D 35/02* (2006.01)
*F02D 37/02* (2006.01)

(52) U.S. Cl.
CPC ....... *F02D 41/3023* (2013.01); *F02D 41/401* (2013.01); *F02P 5/00* (2013.01); *F02P 15/08* (2013.01); *F02D 2200/1015* (2013.01); *Y02T 10/44* (2013.01)

(58) Field of Classification Search
CPC ........... F02D 2200/1015; F02D 41/401; F02D 41/3023; F02D 35/021; F02D 37/02
USPC .............. 123/435, 299, 300, 406.19, 406.26, 123/406.47, 636; 701/103–105, 111; 73/35.07, 114.08, 114.62, 114.63
See application file for complete search history.

(56) References Cited

FOREIGN PATENT DOCUMENTS

| | | |
|---|---|---|
| DE | 10 2011 012 093 A1 | 12/2011 |
| EP | 0 790 406 A2 | 8/1997 |
| JP | 57-194332 A | 11/1982 |
| JP | 6-34491 A | 2/1994 |
| JP | 9-228940 A | 9/1997 |
| JP | 2006-57555 A | 3/2006 |
| JP | 2009-85173 A | 4/2009 |
| WO | WO 2009/116303 A1 | 9/2009 |

OTHER PUBLICATIONS

PCT/EP2014/000426, International Search Report (PCT/ISA/220 and PCT/ISA/210) dated Apr. 29, 2014, with partial English translation, enclosing Written Opinion of the International Searching Authority (PCT/ISA/237) (Eleven (11) pages).

METHOD FOR OPERATING AN INTERNAL COMBUSTION ENGINE AND INTERNAL COMBUSTION ENGINE

The invention relates to a method for operating a combustion engine as well as a combustion engine.

Such a method as well as such a combustion engine can be gleaned as known from DE 10 2011 012 093 A1. In the method, several sparks are generated in at least one combustion chamber of the combustion engine by means of an ignition device, in particular an ignition transformer, of the combustion engine. The several sparks thereby serve to ignite a fuel-air mixture in the at least one combustion chamber such that the fuel-air mixture combusts as a consequence.

Furthermore, in the method, at least one combustion duration of at least one of the sparks is determined. Additionally, a deviation of an actual operation from a target operation of the combustion engine is detected at least depending on the at least one combustion duration of the spark. The deviation is compensated for by the implementation of at least one measure, wherein the measure influences the combustion of the fuel-air mixture in the at least one combustion chamber. To implement the method, the combustion engine comprises, for example, a calculation device which is usually a control unit or an engine control unit of the combustion engine. The calculation device is thereby designed to implement the method.

The object of the present invention is to develop a method for operating a combustion engine as well as a combustion engine of the type referred to at the beginning in such a way that a particularly effective and efficient operation of the combustion engine can be implemented.

In order to create a method by means of which the combustion engine can be operated particularly efficiently and effectively, it is provided according to the invention that the at least one combustion duration of the chronological first of the sparks is determined. The chronologically first spark is allocated to a first spark type or to a second spark type depending on the at least one determined combustion duration. If a value which characterizes a frequency of one of the spark types exceeds a threshold value, then the at least one measure is implemented in order to compensate for the deviation of the actual operation from the desired target operation.

In other words, in the method it is recognized whether the first spark is a spark of the first spark type or of the second spark type. If the first spark belongs, for example, to the first spark type, then the first spark is a so-called sliding spark which has only a relatively low combustion duration. If the first spark is a spark of the second spark type, then the first spark is, for example, a so-called air spark which has a substantially longer combustion duration compared to the sliding spark.

If the formation of sliding sparks occurs, then a high risk exists in comparison to air sparks that the fuel-air mixture in the at least one combustion chamber is not ignited as desired and as a consequence is not combusted as desired or is not combusted at all. Misfires can thus occur which impair the smooth running of the combustion engine as well as its efficient operation.

In the method, now it can be recognized reliably and effectively whether the first spark is a sliding spark or an air spark. As a consequence, boundary conditions for the combustion of the fuel-air mixture in the combustion chamber can be influenced by the implementation of the at least one measure such that the formation of sliding sparks and misfires resulting from this does not occur or no longer occurs. An adaptive control and/or regulation of the combustion engine is thus possible, by means of which the operating points of the combustion engine can, for example, be displaced further in the direction of a lean stratified charge operation without relevant impairments occurring due to too high a number of sliding sparks which have an undesirably short combustion duration. The method thus enables the depiction of a particularly efficient operation of the combustion engine having a low fuel consumption and a very high running smoothness.

In particular it is possible to implement spray-guided combustion methods from direct-injection petrol engines in a stratified charge operation by means of the method. However, it is also of course conceivable to present other operation types effectively and efficiently, such as, for example, a homogeneous operation, a homogeneous lean operation, a cold start, a warm-up, a heating operation to heat at least one exhaust gas after-treatment device and/or a homogeneous stratified operation.

In particular in the lean stratified charge operation having a spray-guided combustion method for direct-injection petrol engines, the risk of misfiring is high. By means of this method, a further optimization of the ignitability of the fuel-air mixture is possible in this context within the lean stratified charge operation as well as within other operation types in that the combustion and in particular the ignition of the fuel-air mixture which is able to be caused by means of the ignition device can be adapted to individual boundary conditions.

If the combustion engine has several combustion chambers, in particular in the form of cylinders, then, advantageously, a cylinder-selective or cylinder-specific implementation of the method is provided. This means that each of the combustion chambers can be adapted to boundary conditions which are present for this combustion chamber, independently of the other combustion chambers in order to implement a robust combustion in each of the combustion chambers, to keep the frequency of misfires particularly low and to stabilize the inflammation phase of the fuel-air mixture, in particular in the stratified charge operation. It is thereby provided that the at least one measure which influences the combustion can be implemented individually for each combustion chamber and independently of the other combustion chambers. Furthermore, it can thereby be provided that different measures can be implemented for each of the combustion chambers in order to be able to adapt each of the combustion chambers individually to the boundary conditions which are present for it. It is thus possible, in particular, to implement a particularly large capability for reduction which leads to a particularly low fuel consumption. Furthermore, particularly high exhaust gas recirculation rates can be implemented with simultaneous implementation of a very good ignitability of the fuel-gas mixture. As a consequence, only particularly low exhaust gas and particle emissions of the combustion engine are able to be implemented.

In a particularly advantageous embodiment of the invention, a signal which characterizes the combustion duration determined by the ignition device and/or a signal which characterizes the frequency of a spark type is provided by the ignition device and is transmitted to the further calculation device which differs from the ignition device, in particular in the form of the engine control unit of the combustion engine. The further calculation device can then implement the at least one measure in order to avoid the occurrence of sliding sparks or to keep their frequency low.

Due to the function distribution between the ignition device and the engine control unit, the method can be implemented quickly and cost-effectively. Also, the determination of the frequency or of the value which characterizes the frequency can already occur by means of the ignition device in order to thus keep the calculation effort low for the engine control unit.

The method can thus be implemented as a whole without additional electrical wires between the ignition device and the calculation device and without additional measuring technology, for example in the ignition device of the engine control unit or the combustion engine. As a consequence, the weight, the costs and the construction space requirements of the combustion engine can be kept to a particularly low level.

It has been shown to be particularly advantageous if a signal which characterizes a change of an activation current transmitted from the engine control unit to the ignition device is used as the signal which characterizes the combustion duration. As a result, the classification of the combustion duration of the first spark can be transmitted in a particularly simple and thus cost-efficient manner.

In the scope of the method, feedback in the form of the signal from the ignition device to the calculating device is used in order to detect a classification of at least one combustion duration. Herein, for example, the present bidirectional interface can be used, as a data transfer path, via which the signal is transferred from the ignition device to the further calculating device (engine control unit), is preferably also used to transmit the signal, in particular in the form of a change of the activation current, from the further calculating device (engine control unit) to the ignition device. Due to such a bidirectional interface, it can be determined in a particularly simple manner, which is efficient in terms of cost and construction space, whether the combustion engine and in particular its at least one combustion chamber will operate at a desired, optimum operating point or not. As a consequence of the analysis of the combustion duration, it is then possible to perform a cylinder-selective optimization of one or more parameters of the combustion engine in order to implement an effective and efficient combustion in the at least one combustion chamber.

In a particularly advantageous embodiment of the invention, the threshold value of the combustion duration information is adjusted variably. The threshold value can thus, for example, be adapted to different boundary conditions and/or to different operational states or operation types of the combustion engine according to need such that a particularly efficient operation having a very high running smoothness of the combustion engine is able to be implemented.

In a further particularly advantageous embodiment of the invention, the at least one combustion duration of the first spark is determined by means of a chronological course of a secondary current of the ignition device. The combustion duration of the first spark can thereby be determined from a respective time duration of a discharge process of a secondary coil of the ignition device which is formed, for example, as an ignition coil or as an ignition transformer by means of the secondary current. The measurement of the secondary current can herein occur at the secondary coil or at a secondary circuit for the spark plug.

In a further particularly advantageous embodiment of the invention, the at least one combustion duration of the first spark is determined by means of a chronological course of a primary current in the ignition device. During the combustion duration of the first spark, the primary current assumes, for example, the value of 0. The combustion duration of the first spark until re-start of the primary current can therefore be determined using the current level. Another possibility is to determine a respective time duration of charging or re-charging times of a primary coil of the ignition device which is formed, for example, as an ignition coil or ignition transformer by means of the chronological course of the primary current. The time duration between the charging and re-charging times corresponds to the combustion duration of the first spark. As a result of this, the combustion duration of the first spark can be determined in a particularly simply manner.

A further embodiment is distinguished in that, as the measure, a quantity of the fuel of the fuel-air mixture introduced into the combustion chamber is changed. Using the variation of the quantity of the fuel, combustion in the at least one combustion chamber which is formed, in particular, as a cylinder of the combustion engine, can be influenced particularly effectively in order to thus avoid misfires or to keep the number of misfires particularly low.

A further, particularly effective possibility to influence combustion is to change an ignition time and/or an injection time as the measure. Herein it is possible, for example, to change the ignition time and the injection time to be parallel in time, wherein a duration between the ignition time and the injection time remains the same.

Advantageously, in a further embodiment of the invention it is provided that, as the measure, the injection time is changed relative to the ignition time. As a result, a so-called difference angle, i.e., a time duration between the injection of the fuel and the ignition of the same, is changed.

Alternatively or additionally, it is possible to change a number of injection processes to introduce the fuel into the combustion chamber and/or a chronological sequence of the injection processes. Preferably, the at least one measure is implemented for so long and/or so often until the frequency of the relevant spark type, in particular of the sliding spark, reduces and, for example, falls below the threshold value.

Preferably, the compensation of the deviation, i.e., the implementation of the at least one measure, occurs separately for each combustion chamber, i.e., in a cylinder-specific or cylinder-selective manner. Thus, a particularly effective and efficient operation of the combustion engine is able to be implemented having only very low emissions and a very high running smoothness.

The invention also includes a combustion engine. To implement a particularly effective and efficient operation of the combustion engine, it is provided according to the invention that the calculating device of the combustion engine is designed to determine the at least one combustion duration of the chronological first of the sparks in order to allocate the first spark to a first spark type or to a second spark type depending on the at least one determined combustion duration, and to implement the at least one measure if at least one value which characterizes a frequency of one of the spark types exceeds a threshold value. In other words, the calculating device is designed to implement the method according to the invention. Advantageous embodiments of the method according to the invention are to be considered as advantageous embodiments of the combustion engine according to the invention and vice versa. It has been shown to be particularly advantageous if additionally, for the compensation, a deviation of an actual running smoothness from a target running smoothness and/or a misfire and/or a deviation of an actual pressure from a target pressure and/or a deviation of an actual pressure course from a target pressure course in at least one combustion chamber is detected.

All depicted possibilities, methods and measures for the compensation of the deviation can be applied permanently during the operation of the combustion engine such that a permanent adaptation of the cylinder-selective corrections occurs. The method can be used for all operation types of a combustion engine. The implementation in a lean stratified charge operation in which the risk of misfires is particularly high is particularly advantageous.

Further advantages, features and details of the invention result from the description of preferred exemplary embodiments below, as well as by means of the drawings. The features and feature combinations referred to in the description as well as the features and feature combinations referred to below in the description of the figures and/or shown solely in the figures can be used not only in each specified combination but also in other combinations or alone without leaving the scope of the invention.

DETAILED DESCRIPTION OF THE DRAWINGS

Figure 1:
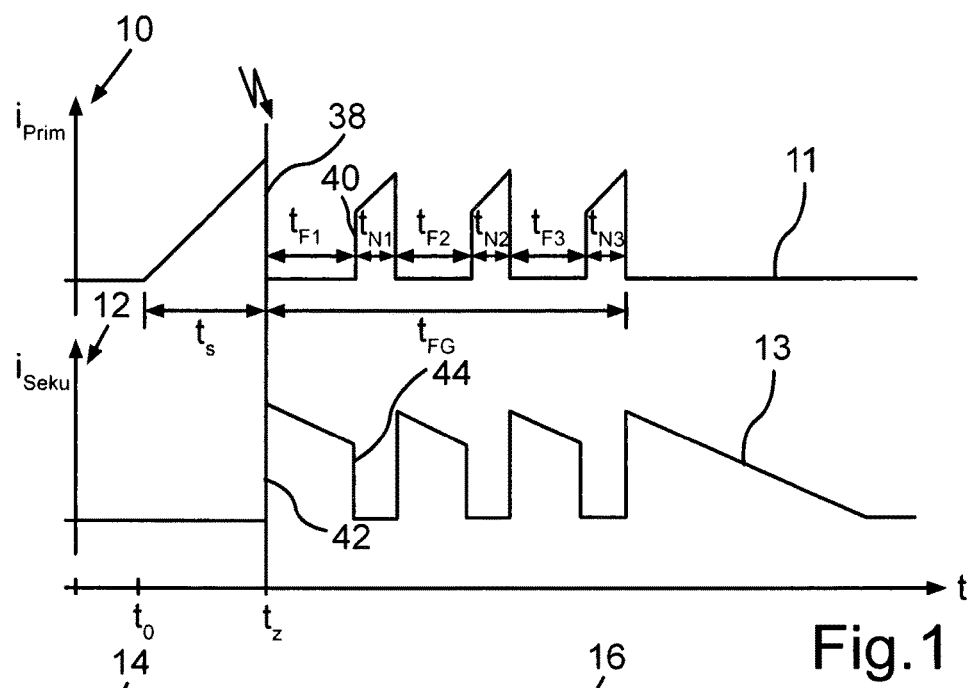
FIG. 1 is a diagram having a chronological course of a primary current and a secondary current of an ignition device in the form of an ignition coil of a combustion engine, in which several sparks are generated in a combustion chamber in the form of a cylinder of the combustion engine by means of the ignition coil in order to ignite a fuel-air mixture in the cylinder.

In the figures, the same or functionally identical elements are provided with the same reference numerals.

FIG. 1 shows a first diagram 10 having a chronological course 11 of a current strength of a primary current $i_{Prim}$ of an ignition coil of a combustion engine. The combustion engine is thereby formed as a reciprocating combustion engine and serves to drive a motor vehicle, in particular a passenger motor vehicle. The combustion engine has a plurality of combustion chambers in the form of cylinders. An injector is allocated to each of the cylinders by means of which a pre-determinable quantity of liquid fuel is injected directly into the respective cylinder. The combustion engine is thus a direct-injection combustion engine, in particular a direct-injection petrol engine.

Air is also supplied to the respective cylinders via at least one intake module of the combustion engine. The air flowing into the respective cylinder and the respectively introduced fuel form a respective fuel-air mixture which is or are ignited by means of at least one respective spark plug of the respective cylinder in order to combust in connection to this ignition.

In the case of the combustion engine, therein a so-called multiple ignition is provided which is also referred to as a multiple spark ignition or as a multi-spark ignition. For this purpose, the spark plug and the ignition device which is coupled to the spark plug in the form of an ignition coil generates several ignition sparks in the respective cylinder, wherein these several ignition sparks are generated to be chronologically consecutive, i.e., next to one another in time.

FIG. 1 also shows a second diagram 12 having a chronological course 13 of a secondary current $i_{Seku}$ of the respective ignition coil. Both courses 11, 13 are thus applied depending on the time t.

The respective ignition coil, which is usually also referred to as an ignition transformer, has a primary side and a secondary side. The primary side is connected to the system voltage of the motor vehicle via a corresponding adjustment device by means of which the primary current $i_{Prim}$ can be adjusted, i.e., can be controlled and/or regulated. The adjustment device is, for example, a calculating device of an engine control unit of the combustion engine. The ignition coil furthermore has a secondary side which is coupled to the primary side. The secondary side is thereby connected to the spark plug, by means of which the individual sparks are generated.

At the time $t_0$, a primary current $i_{Prim}$ is generated on the primary side in a corresponding circuit of the ignition coil, wherein the amplitude of the primary current $i_{Prim}$ increases over the course of time. As soon as a corresponding amplitude of the primary current $i_{Prim}$ is achieved, the ignition occurs at an ignition time $t_z$. The time duration between the ignition time $t_z$ and the time $t_0$ is also referred to as a closing time $t_s$. At the ignition time $t_z$, the primary current $i_{Prim}$ is switched off, whereby a secondary current $i_{Seku}$ is generated on the secondary side, for example in a circuit of the ignition coil. As a consequence of the secondary current $i_{Seku}$ a spark is generated at the spark plug. The time duration of the combustion of the spark is also referred to as a combustion duration.

The combustion duration of the chronological first of the several sparks is referred to with $t_{F1}$. The primary current $i_{Prim}$ assumes the value 0 for the combustion duration $t_{F1}$ of the first spark. The amplitude of the secondary current $i_{Seku}$ reduces during the combustion duration $t_{F1}$ of the first spark. The primary current $i_{Prim}$ is switched on again following the combustion duration $t_{F1}$ of the first spark, wherein the amplitude of the primary current $i_{Prim}$ increases constantly over the time t. The time duration, during which the primary current $i_{Prim}$ is switched on again after the combustion duration $t_{F1}$ of the first spark, is referred to as a first re-charging time $t_{N1}$. The secondary current $i_{Seku}$ assumes the value 0 during the first re-charging time $t_{N1}$.

The primary current $i_{Prim}$ is switched off again after the expiry of the first re-charging time $t_{N1}$. A second spark which chronologically follows the first spark is therefore generated at the spark plug, the second spark combusting for a corresponding combustion time $t_{F2}$. The primary current $i_{Prim}$ is switched on again for a second re-charging time $t_{N2}$ after expiry of the second combustion duration $t_{F2}$. A corresponding secondary current $i_{Seku}$ is generated after expiry of the second re-charging time $t_{N2}$ by switching off the primary current $i_{Prim}$, as a consequence of which a third spark is generated at the spark plug. The third spark combusts therein for a third combustion duration $t_{F3}$.

The closing time $t_s$ is a first charging time during which the ignition coil is charged, so to say, before the generation of the first spark occurs, which combusts during the first combustion duration $t_{F1}$. The first re-charging time $t_{N1}$ is thus a second charging time, wherein the second re-charging time $t_{N2}$ is a third charging time and the third re-charging time $t_{N3}$ is a fourth charging time.

In the scope of a method for operating the combustion engine, now the first combustion duration $t_{F1}$ of the first spark is detected, for example, as a time between the end of the first charging time (closing time $t_s$) and the beginning of the second charging time (first re-charging time $t_{N1}$) in the ignition coil, i.e., by means of this. For this purpose, the ignition coil comprises, for example, a further calculating device which is different to the engine control unit and is provided in addition to this. The detection of the first combustion duration $t_{F1}$ can occur, for example, via the measurement of a respective switch-on or switch-off gradient of the primary current $i_{Prim}$ or the chronological course 11 thereof and/or via the measurement of the respective gradient of the secondary current $i_{Seku}$ or the chronological course 13 thereof.

The information concerning the first combustion duration $t_H$ of the first spark in the multiple ignition operation is preferably deposited, i.e., stored, in the ignition coil, in particular in a memory device of the ignition coil, and—as is explained below—is evaluated statistically in an intermediate memory.

Despite development-side protection of the application of the combustion engine, in the case of unfavorable combinations of the load point of the combustion engine, the charge movement in the cylinder and the individual fuel sprays of the injector, critical situations at the spark plug of the respective cylinder can occur such that, for example, a heavy wetting of electrodes of the spark plug and, in the case of a corresponding ignition time, a disturbance of the respective, triggered spark occurs. In an extreme case, the first spark occurs as a sliding spark which represents a high risk factor for a subsequent misfire.

Usually, the respective spark occurs as desired, so-called air spark by means of which a desired ignition and as a consequence a desired combustion of the fuel-air mixture is caused. The sliding spark is thus an undesired, first spark type, wherein an air spark is a desired, second spark type. In the method it is provided to determine the combustion duration $t_{F1}$ of the first spark and to allocate the first spark to the first spark type or to the second spark type depending on the determined first combustion duration $t_{F1}$. A sliding spark recognition therefore takes place. Due to the recognition of the occurrence of sliding sparks, it can be concluded that a true actual operation of the combustion engine deviates from a desired target operation at least with regard to one of the cylinders in which the occurrence of sliding sparks is determined. As a consequence, by means of the sliding spark recognition, at least one measure can be taken, i.e., can be carried out, by means of which the deviation of the actual operation from the target operation is compensated for. In other words, the formation of sliding sparks is avoided and/or an occurrence frequency of sliding sparks in comparison to a time before the implementation of the at least one measure is reduced by means of the at least one measure.

Figures 2, 3:
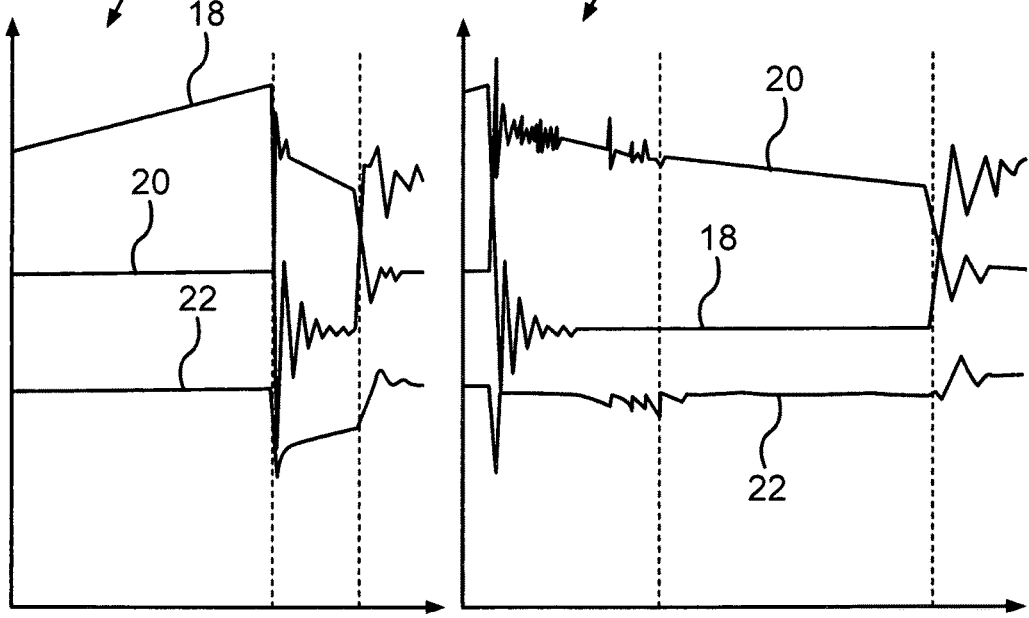
FIG. 2 is a diagram having a respective chronological course of the primary current, of the secondary current and of a secondary voltage of the ignition coil, wherein the courses characterize the formation of a sliding spark.
FIG. 3 is a further diagram having a respective course of the primary current, of the secondary current and of the secondary voltage of the ignition coil, wherein the courses characterize the formation of a desired air spark.

By means of FIGS. 2 and 3 it is illustrated how a sliding spark differs from an air spark and how, consequently, it can be determined whether the first spark is a sliding spark or an air spark. FIGS. 2 and 3 show a respective diagram 14, 16 having respective, chronological courses 18, 20 and 22. The course 18 is therein a chronological course of the primary current $i_{Prim}$. The course 20 is a chronological course of the secondary current $i_{Seku}$, and the course 22 is a chronological course of a secondary voltage $U_{Seku}$ of the secondary side or in the circuit on the secondary side.

In comparison to an air spark, a sliding spark has a substantially shorter combustion duration which clearly differs from the combustion durations of more or less disturbed air sparks. The courses 18, 20, 22 shown in FIG. 2 occur if the first spark occurs as a sliding spark. Contrary to this, if the first spark occurs as an air spark, the courses 18, 20, 22 shown in FIG. 3 occur.

The combustion durations of sliding sparks thereby clearly differ from the combustion durations of air sparks, even if the air sparks are disturbed very highly by high flow speeds and/or by wetting of the electrodes of the spark plug by fuel spray. A clear allocation of the spark types to the combustion durations can thus be depicted.

A statistical evaluation of all first sparks occurring during this operation duration can now be carried out via a predetermined or predeterminable time or operation duration of the combustion engine, by means of the engine control unit, wherein respective values are determined which characterize a respective frequency of the occurrence of the respective spark type during this operation duration. This can also be implemented by means of the further calculation device of the ignition coil, i.e., in the ignition coil itself.

Figure 4:
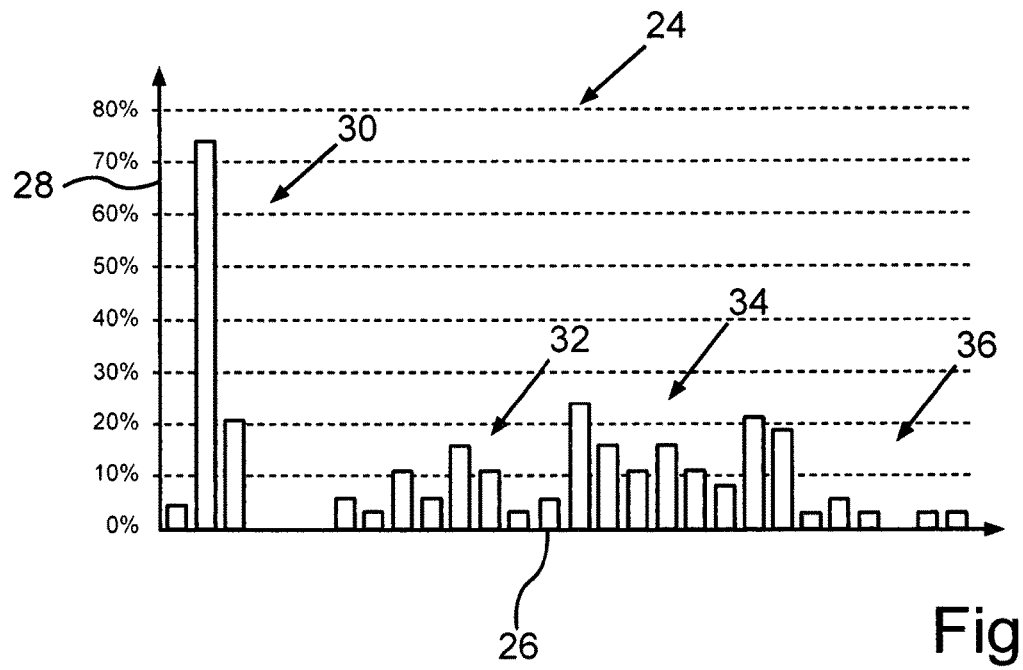
FIG. 4 is a diagram to illustrate a spark duration distribution of the chronological first of the sparks.

This statistical evaluation is illustrated by means of FIG. 4. FIG. 4 shows a diagram 24 on the y-axis 26 of which the combustion duration is plotted in μs. The frequency with which the respective combustion duration and thus the respective spark types occur during the operation duration is plotted on the x-axis 28 of the diagram 24 in the unit %. Thus characterizing bars 30 in diagram 24 characterize the frequency of the occurrence of sliding sparks, whilst bars 32 characterize the frequency of air sparks having high disturbance, bars 34 characterize the frequency of air sparks having moderate disturbance and bars 36 characterize the frequency of air sparks without disturbance. If a value which characterizes the frequency of the sliding sparks, i.e., for example at least one of the bars 30, now exceeds a threshold value, then the at least one measure is implemented in order to compensate for the deviation of the actual operation to the target operation.

The statistical evaluation illustrated by means of FIG. 4 can thereby occur individually and thus specifically or selectively for each of the cylinders of the combustion engine such that corresponding measures can be taken for each of the cylinders, independently of the remaining other cylinders in order to compensate for the deviation. Herein particular measures can be implemented for each cylinder independently of the remaining cylinders in order to optimize each cylinder individually and selectively with respect to a robust combustion and the reduction of misfires.

In other words, the first combustion duration $t_{F1}$ of each first spark is measured, preferably in the ignition coil, wherein the first combustion duration $t_{F1}$ is also referred to as a spark duration $t_{Bsek}$. The respective spark duration $t_{Bsek}$ and thus the relevant first spark is assigned to air or sliding spark and deposited in a memory, in particular in an intermediate memory, in order to implement a statistical evaluation of the occurrence frequency of sliding sparks therefrom.

Preferably, the measurement of the respective spark duration $t_{Bsek}$ occurs via a measurement of the time or a duration between a switch-off edge 38 of the primary current signal in the form of the chronological course 11 after the first charging and a switch-on edge 40 of the primary current signal for the second charging. Alternatively, the spark duration $t_{Bsek}$ can also occur via the measurement of the time between a switch-on edge 42 of the secondary current signal in the form of the chronological course 13 for the first discharge and a switch-off edge 44 of the secondary current signal at the end of the first discharge.

If the value which characterizes the frequency of the sliding spark exceeds the set, adaptive or controllable threshold value which is allocated to the respective cylinder, for example, in an operating point, then the respective ignition coil of the respective cylinder, for example, provides a corresponding signal which characterizes the exceeding which is transmitted to the engine control unit. This can then cause the implementation of the at least one measure for the respective cylinder.

Figure 5:
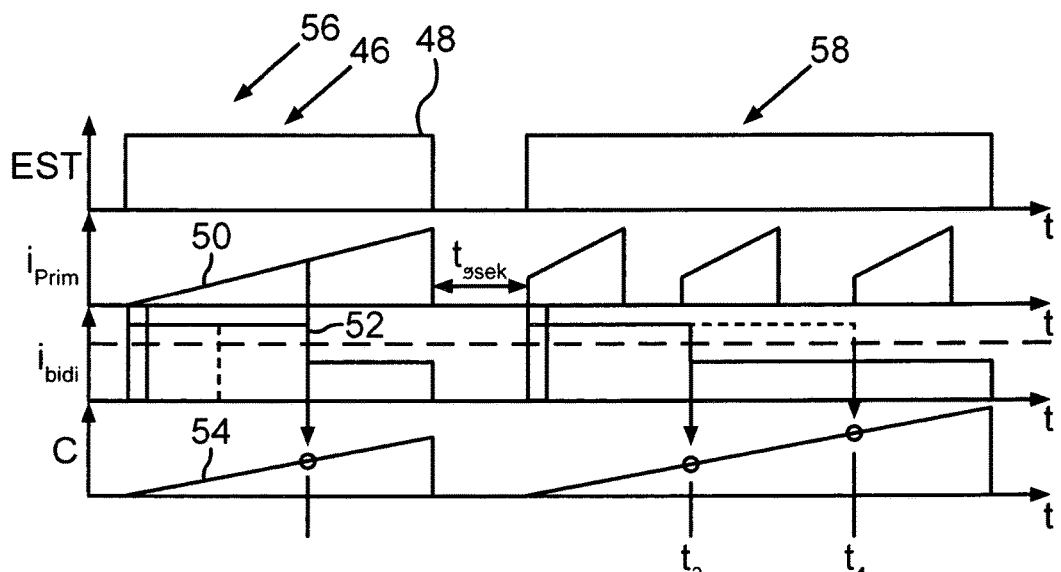
FIG. 5 is a diagram having chronological courses of different signals by means of which it can be determined whether the chronologically first spark is a desired air spark or a desired sliding spark.

A possibility is illustrated by means of FIG. 5 as to how the spark duration $t_{Bsek}$ which is determined by means of the ignition coil or a signal which characterizes the first spark as a sliding spark or as an air spark can be transmitted from the ignition coil to the engine control unit in a particularly simple manner, in particular without additional wires. Therein, FIG. 5 shows a diagram 46 having respective chronological courses 48, 50, 52, 54 of respective signals which are explained below.

A voltage is created via a bi-directional interface at the ignition coil of the engine control unit via an activation signal EST, wherein the chronological course 48 characterizes the chronological course of the signal EST. This voltage is thereby created at a circuit of the ignition coil. An activation current $i_{bidi}$ results from this voltage in the corresponding circuit of the ignition coil. After a determined time, a resistance in this circuit is switched to the ignition coil. Thus a step results in the chronological course 52 which characterizes the chronological course of the activation current $i_{bibi}$. This step is detected by means of the engine control unit. This step or the time of this step of the course 52 is used in order to stop a counter or a counter signal C which is started at the beginning of the signal EST. The value of the counter C or the value of its chronological course 54 is transferred from the ignition coil to the engine control unit. The value of the counter C is compared to a threshold value.

If the ignition coil determines, due to the evaluation of the spark duration $t_{Bsek}$, that the first spark has occurred as a sliding spark and not as an air spark, then the activation current $i_{bidi}$ is later switched from a higher to a comparatively low value on the coil side than in the case of recognition of the occurrence of an air spark. In other words, the step occurs later in the course 52 if a sliding spark occurs in comparison to the occurrence of an air spark. The value of the counter C which is transferred to the engine control unit is therefore greater such that the engine control unit can conclude that a sliding spark has occurred.

Two partial regions 56, 58 of the signal EST can be recognized in the diagram 46. The counter C is also started at the respective beginning of the partial region 56 and 58. The first partial region 56 is therein an EST pulse which serves for the diagnosis. For example, it is determined by means of the first EST pulse, whether the primary current $i_{Prim}$ is present and thus whether, for example, a short circuit or an open circuit is present. The partial region 58 is a second EST pulse which is finally used in order to determine whether the first spark is a sliding spark or an air spark.

If the step of the course 52 occurs at a time $t_3$, then it is determined that the first spark is an air spark. If the step of the course 52 occurs only at a time $t_4$ which is later compared to the time $t_3$, then it is thus determined that the combustion duration $t_{F1}$ of the first spark was too short for an air spark such that the first spark is a sliding spark. In this way, for example, a signal can be transmitted to the engine control unit which characterizes the exceeding of the threshold value by the value which characterizes the frequency if such an evaluation has also already occurred in the ignition coil.

The value of the counter C can then be used in the engine control unit in order to compare, for example, the state of the respective cylinder reported by the ignition coil to the engine control unit with misfire entries of the cylinder. Depending on this comparison, measures can then be implemented in order to prevent or to reduce misfires in this cylinder.

Therein it can be provided that the at least one measure is implemented prophylactically before the occurrence of misfires and/or in the case of increased misfire frequency in this cylinder. Furthermore, a corresponding counter measure can also be implemented in the case of occurrence of an increased running smoothness and/or in the case of occurrence of misfires.

The activation current $i_{bidi}$ or the course 52 thereof is thus a signal which characterizes the spark type, the signal being transferred to the engine control unit in the multiple ignition operation as a change of the activation current $i_{bidi}$. This signal which is transferred from the ignition coil to the engine control unit characterizes the state of the inflammation in the respective cylinder. Likewise it is, however, possible to transfer, for example, a temperature and thus any occurrence of an excess temperature of the ignition coil to the engine control unit using this signal. The signal transmitted to the engine control unit in the form of the activation current $i_{bidi}$ can then be used by the engine control unit in order to use the depicted, statistical evaluation of the spark duration $t_{Bsek}$ or the combustion duration $t_{F1}$ of the first spark, and in order to implement the at least one measure to compensate for the deviation depending on this statistical evaluation or to cause the implementation thereof.

For example, a so-called difference angle between an injection time and an ignition time can be changed as a measure to compensate for the deviation. In other words, a time duration between a time at which the fuel is injected into the cylinder and a time at which the fuel-air mixture is ignited is changed. The fuel is introduced into the cylinder, for example, by means of multiple injection, wherein several injections are implemented. In the case of the change of the difference angle, the ignition time is thus changed relative to the injection time. Alternatively it can be provided that the injection time and the ignition time can be displaced in parallel and, in particular, in a cylinder-selective manner without the time duration between the injection time and the ignition time being changed. Alternatively or additionally, the fuel mass, the number of injections and/or the chronological sequence of the injections can also be changed in such a way that in the case of those cylinders in which an excessively high frequency of sliding sparks is determined, the relative number of sliding sparks reduces.

Alternatively or additionally, an intervention in the load control of the cylinder can also occur via cylinder-selective adjustments of the injection quantity and/or of the injections during multiple injection. Likewise, an intervention in the parameter-setting of the multiple ignition can occur. Furthermore it is possible to apply parameter changes or at least one parameter change to several cylinders of a cylinder bank corresponding to an ignition sequence and/or to all cylinders of the combustion engine. Advantageously, the interventions referred to occur via freely programmable characteristic diagrams in the engine control unit.

Preferably it is provided that the depicted change of the parameters is implemented incrementally, wherein after each adjustment procedure, a feed-back to the ignition coil occurs which in turn evaluates its statistics again via the sliding sparks in relation to the air sparks or follows the course thereof. This means that, furthermore, in the ignition coil, a statistical evaluation of the respective combustion durations having the difference between sliding sparks and air sparks occurs, wherein additionally, the change of the respective occurrence frequency is observed.

If there are no changes to the occurrence frequency of the sliding sparks in the defined characteristic diagram region or operational state after the incremental adjustment of one or more of the parameters referred to in the engine control unit, and the sliding spark frequency does not fall below a defined level, then the signal to signal the excessively frequent occurrence of the sliding sparks is transmitted again from the ignition coil to the engine control unit and an adjustment is repeated until the occurrence frequency of the sliding sparks reduces in the defined characteristic diagram region or operational state. Alternatively, even without a change of the occurrence frequency of the sliding sparks, solely due to the evaluation of the misfire frequency and/or the running smoothness of the combustion engine, the procedure can be ended and the new parameters can be established in the engine control unit in a cylinder-selective manner.

If the occurrence frequency of the sliding sparks falls below a defined level in the defined characteristic diagram region or operational state, the signal transmitted from the ignition coil to the engine control unit is changed in such a way that it characterises a standard operational state without excessive occurrence of sliding sparks. This signal which characterises the standard operational state is then transmitted to the engine control unit. Using this information, the at least one, incrementally adjusted parameter is established by the engine control unit and is stored for this cylinder. The stored parameter change can, for example, occur or be applied in an additive, percentage or factorial manner in the noticeable load region, operational state or load state and can be transferred to other load states, operational types, characteristic diagram regions or cylinders.

Preferably, in the engine control unit, the occurrence frequency of misfires or sliding sparks is furthermore documented or deposited in an error memory. If the misfire frequency does not reduce or does not significantly reduce after change and establishment of the parameters, then advantageously, the described method can be repeated until the occurrence frequency of the sliding sparks falls below a defined, second lower level.

The described, cylinder-selective and iterative change of the parameter referred to can therein occur multiple times. Furthermore it is preferably provided that the changes of the parameters which are carried out are cancelled in the case of a change of the respective injectors, the respective spark plugs and/or parts of the ignition device in order to start from scratch with newly installed parts accompanying new boundary conditions for the combustion, the sliding spark analysis or the sliding spark recognition.

The invention claimed is:

1. A method for operating a combustion engine, comprising the steps of:
   generating a plurality of sparks to ignite a fuel-air mixture in a combustion chamber by an ignition device of the combustion engine;
   determining a combustion duration of at least one of the plurality of sparks by a calculating device;
   determining the combustion duration of a chronological first spark of the plurality of sparks by the calculating device;
   allocating the first spark to a first spark type or to a second spark type depending on the combustion duration of the first spark by the calculating device; and
   adjusting operation of the combustion engine by an engine control unit if a value which characterizes a frequency of one of the spark types exceeds a threshold value.

2. The method according to claim 1, wherein the calculating device is in the ignition device.

3. The method according to claim 2, wherein a signal which characterizes the determined combustion duration and/or a signal which characterizes the frequency is provided by the ignition device and is transmitted to a calculating device of the combustion engine which is different from the ignition device.

4. The method according to claim 1, wherein the threshold value is adjusted variably.

5. The method according to claim 1, wherein the combustion duration of the first spark is determined by a chronological course of a secondary current of the ignition device.

6. The method according to claim 1, wherein the combustion duration of the first spark is determined by a chronological course of a primary current of the ignition device.

7. The method according to claim 1, wherein as the measure, a quantity of a fuel of the fuel-air mixture introduced into the combustion chamber is changed.

8. The method according to claim 1, wherein as the adjusting, an injection time and/or ignition time is changed.

9. The method according to claim 8, wherein the injection time is changed relative to the ignition time.

10. A combustion engine, comprising:
    a combustion chamber having an ignition device to generate a plurality of sparks to ignite a fuel-air mixture in the combustion chamber and having a calculating device, wherein the calculating device is configured to:
       determine a combustion duration of at least one of the plurality of sparks;
       determine the combustion duration of a chronological first spark of the plurality of sparks; and
       allocate the first spark to a first spark type or to a second spark type depending on the combustion duration of the first spark; and
    an engine control unit, wherein the engine control unit adjusts operation of the combustion engine if a value which characterizes a frequency of one of the spark types exceeds a threshold value.

11. A method for operating a combustion engine, comprising the steps of:
    generating a plurality of sparks to ignite a fuel-air mixture in a combustion chamber by an ignition device of the combustion engine;
    determining a combustion duration of a chronological first spark of the plurality of sparks by a calculating device;
    allocating the first spark to a first spark type or to a second spark type depending on the combustion duration of the first spark by the calculating device; and
    adjusting operation of the combustion engine by an engine control unit if a value which characterizes a frequency of one of the spark types exceeds a threshold value.

12. The method according to claim 11, wherein the calculating device is in the ignition device.

* * * * *